(12) United States Patent  (10) Patent No.: US 8,426,547 B2
Su et al.  (45) Date of Patent: Apr. 23, 2013

(54) PHOSPHORUS-CONTAINING EPOXY RESIN AND METHOD FOR SYNTHESIZING THE SAME

(75) Inventors: Fang-Hsien Su, Hsinchu County (TW); Chi-Hung Liu, Hsinchu County (TW); Chun-Hsiung Kao, Hsinchu County (TW); An-Pang Tu, Hsinchu County (TW); Kuen-Yuan Hwang, Hsinchu County (TW)

(73) Assignee: Chang Chun Plastics Co., Ltd, Taipei (TW)

( * ) Notice: Subject to any disclaimer, the term of this patent is extended or adjusted under 35 U.S.C. 154(b) by 516 days.

(21) Appl. No.: 12/748,458

(22) Filed: Mar. 29, 2010

(65) Prior Publication Data

US 2011/0172384 A1  Jul. 14, 2011

(30) Foreign Application Priority Data

Jan. 13, 2010 (TW) .................. 99100837 A

(51) Int. Cl.
*C08G 79/04* (2006.01)
*C08G 65/10* (2006.01)
(52) U.S. Cl.
USPC .................. 528/99; 528/89; 528/91; 528/93; 528/94
(58) Field of Classification Search ........ 528/96
See application file for complete search history.

(56) References Cited

U.S. PATENT DOCUMENTS 7,064,157 B2 * 6/2006 Hwang et al. ............... 523/435
2010/0016585 A1  1/2010 Lin et al.

* cited by examiner

*Primary Examiner* — Peter F Godenschwager
*Assistant Examiner* — David Karst
(74) *Attorney, Agent, or Firm* — CKC & Partners Co., Ltd.

(57) ABSTRACT

A phosphorus-containing epoxy resin and a method for synthesizing the same are disclosed. The method includes the step of catalytically reacting compound (i) with compound (ii) to synthesize the phosphorus-containing epoxy resin having the structure of compound (I). R is methyl or phenyl, and n is the integer from 1 to 9.

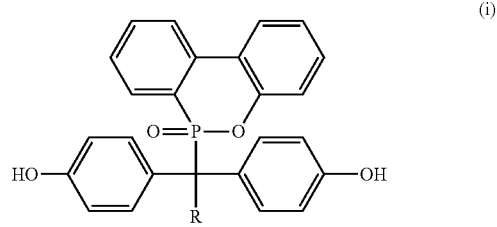

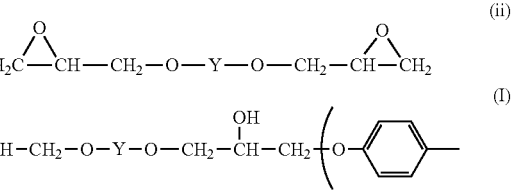

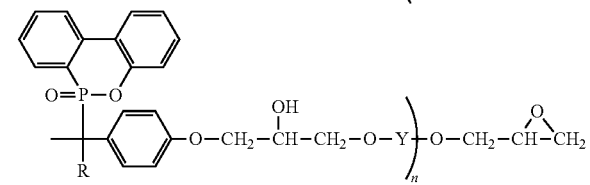

10 Claims, 8 Drawing Sheets

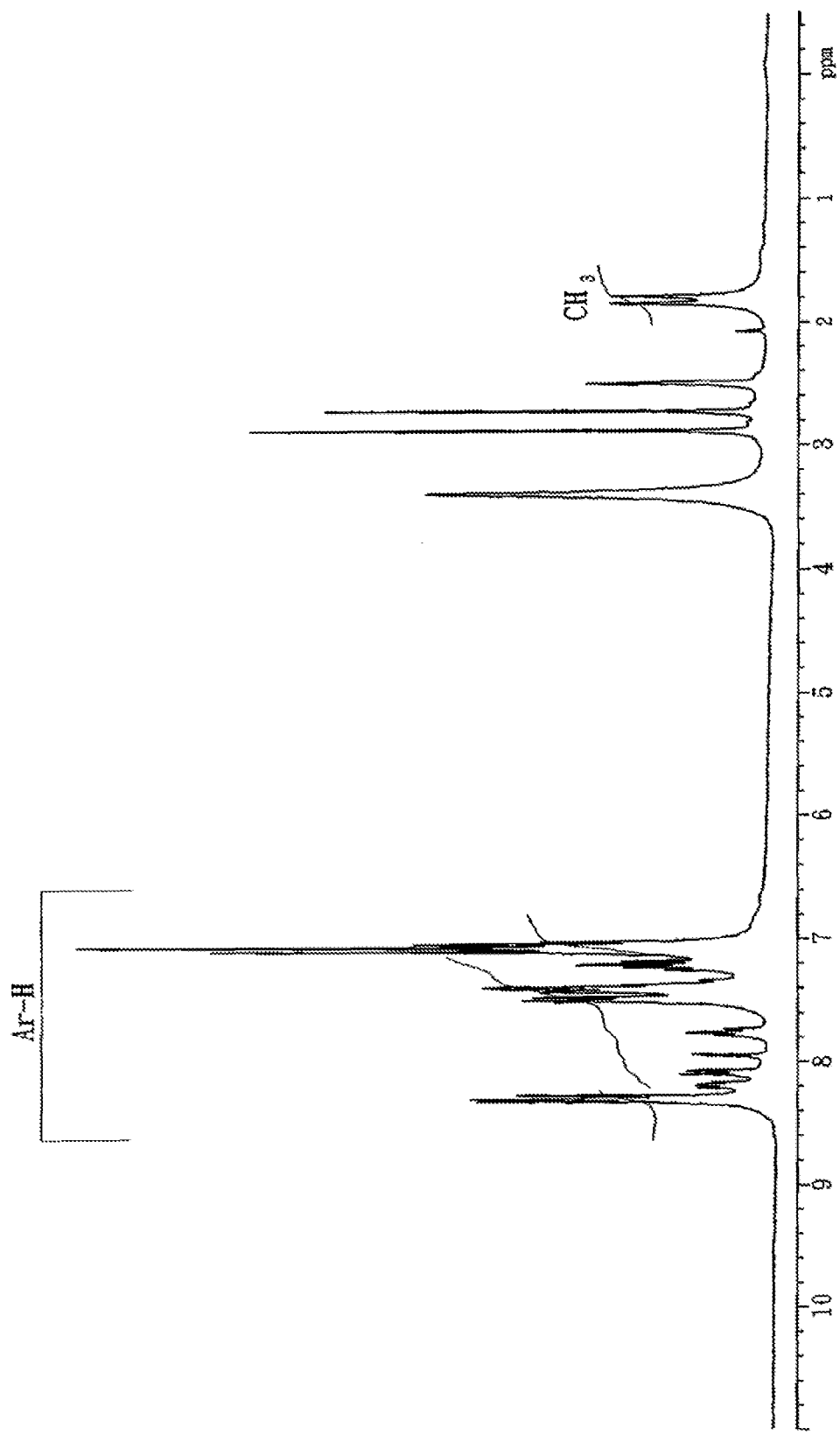

PHOSPHORUS-CONTAINING EPOXY RESIN AND METHOD FOR SYNTHESIZING THE SAME

RELATED APPLICATIONS

This application claims priority to Taiwan Application Serial Number 99100837, filed Jan. 13, 2010, which is herein incorporated by reference.

BACKGROUND

1. Field of Invention

The present invention relates to phosphorus-containing compounds. More particularly, the present invention relates' to a bisphenol epoxy resins containing phosphorus and the methods for synthesizing the same.

2. Description of Related Art

Traditional printed circuit boards were usually formed by curing an epoxy resin containing a flame retardant containing halogen and antimony trioxide. However, corrosive gas and carcinogens, such as dioxin and benzofuran, will be produced when the epoxy resin above is burned.

Recently, it is found that organic phosphorous compounds added into polymer can make the polymer more flame-retardant. Furthermore, less toxic gases and smoke will be produced when the organic phosphorous compounds are burned. Therefore, an organic phosphorus containing bisphenol monomer, HPP, is introduced into an epoxy monomer to form an epoxy resin, and the chemical structure of the HPP is shown below:

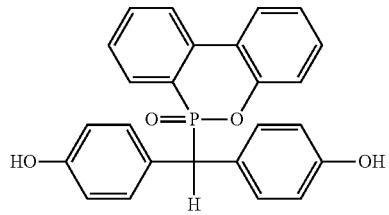 [SMILES: O=P1(C(c2ccc(O)cc2)c2ccc(O)cc2)Oc2ccccc2-c2ccccc21]

Since an alkaline solution is needed in several steps of the manufacturing process of printed circuit boards, the epoxy resin for making the printed circuit boards should be alkali resistance. However, the central C—H connected to the P atom in the chemical structure above is active hydrogen. Thereby preventing the epoxy resin containing the phosphorus bisphenol moiety from being used to make printed circuit boards.

SUMMARY

A phosphorus-containing epoxy resin is provided and defined by a general formula (I):

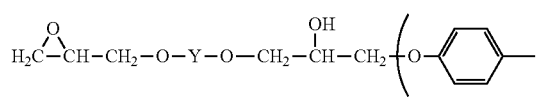

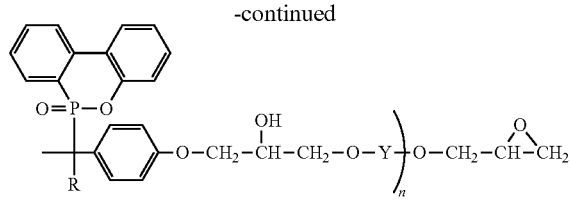

wherein n is an integer from 1 to 9, R is methyl or phenyl, and Y is selected from the group consisting of

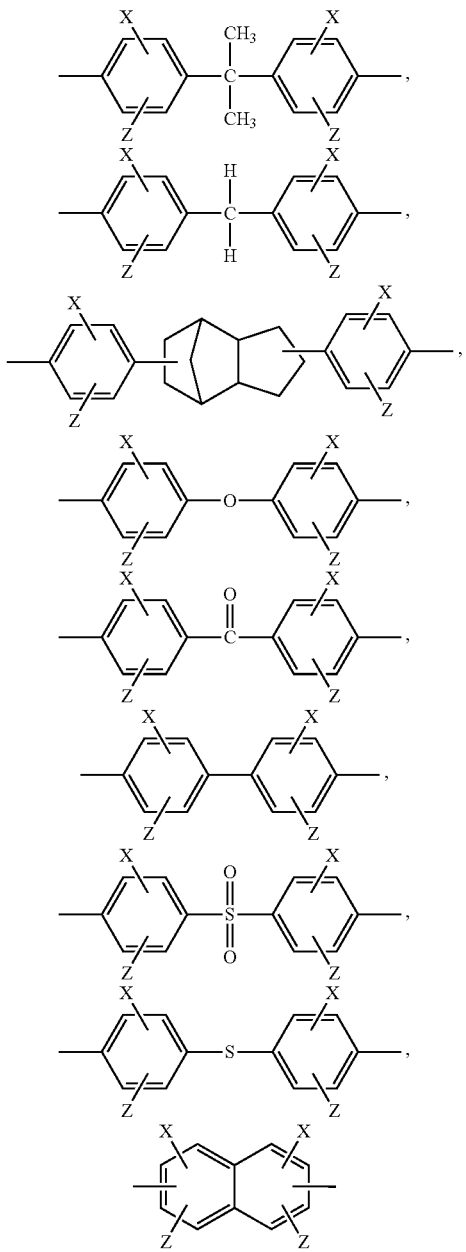

X and Z are independently selected from the group consisting of a hydrogen atom, an alkyl group having 1 to 6 carbon atoms, an alkoxyl group having 1 to 6 carbon atoms, —$CF_3$, a phenyl group, a halogen atom, a phenoxyl group, and a cyclic alkyl group having 3 to 7 carbon atoms.

A method for synthesizing a phosphorus-containing epoxy resin is provided. The method includes the step of performing a catalytic reaction of a phosphorus-containing bisphenol shown in formula (i) and an epoxy monomer shown in formula (ii) to yield the phosphorus-containing epoxy resin defined by the formula (I),

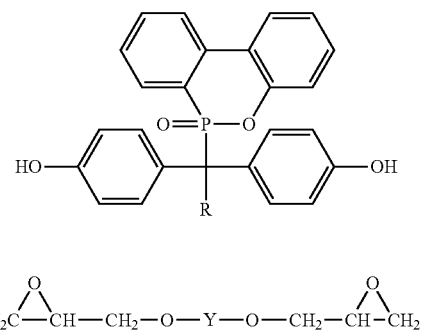

(i)

(ii)

wherein R is methyl or phenyl, and Y is selected from the group consisting of

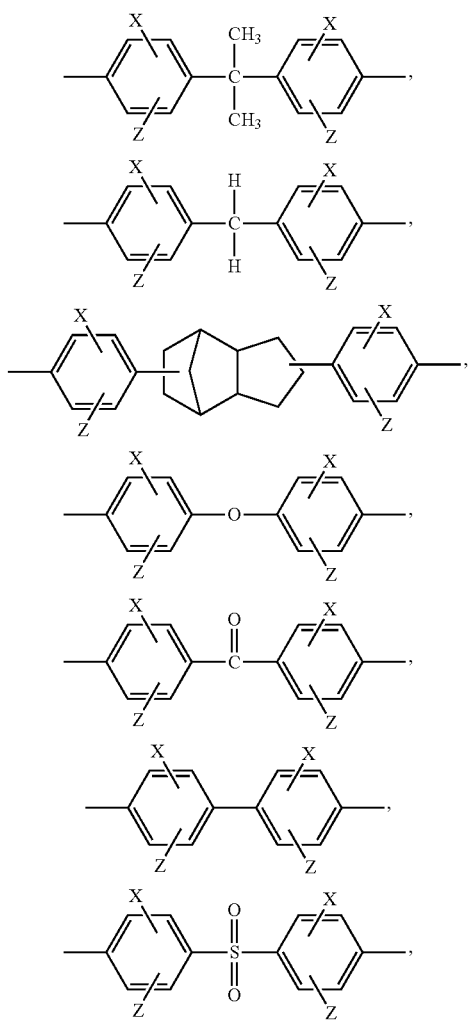

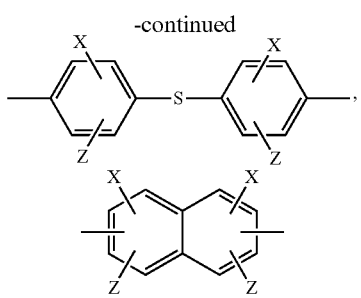

X and Z are independently selected from the group consisting of a hydrogen atom, an alkyl group having 1 to 6 carbon atoms, an alkoxyl group having 1 to 6 carbon atoms, —$CF_3$, a phenyl group, a halogen atom, a phenoxyl group, and a cyclic alkyl group having 3 to 7 carbon atoms.

BRIEF DESCRIPTION OF THE DRAWINGS

The invention can be more fully understood by reading the following detailed description of the embodiment, with reference made to the accompanying drawings as follows:

FIG. 1A and FIG. 1B are diagrams of $^1$H NMR spectra of a dinitro derivative of the example 1 before and after the dinitro derivative dissolved in the alkaline solution, respectively;

DETAILED DESCRIPTION

Method for Synthesizing Phosphorus-Containing Bisphenols

Figure 1A:
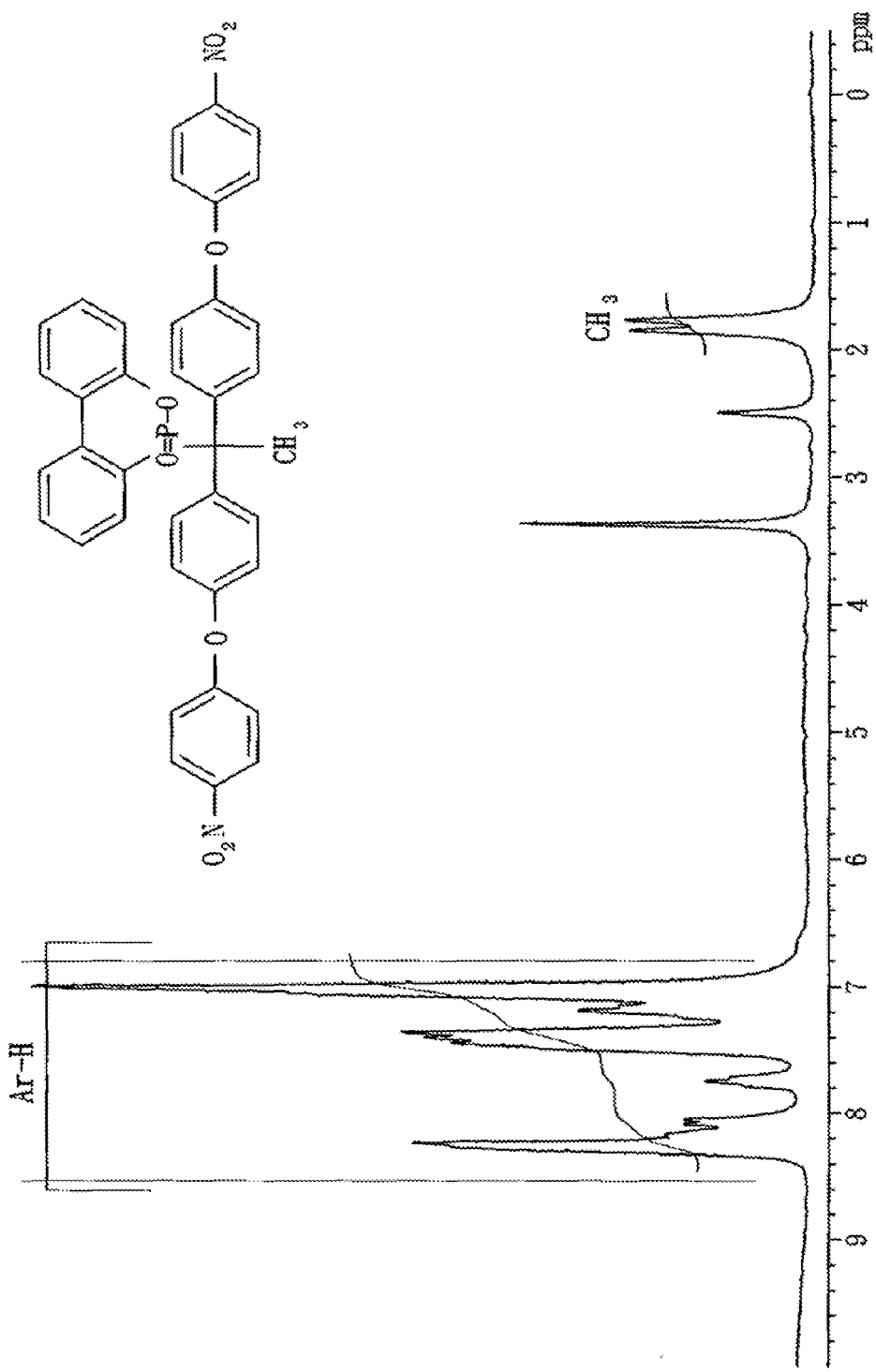

The phosphorus-containing bisphenol is synthesized by an acid-catalyzed reaction among DOPO (9,10-dihydro-9-oxa-10-phosphaphenanthrene-10-oxide), i.e. a cyclic organic phosphorous compound, shown in formula (a), a compound shown in formula (b), and a phenol compound shown in formula (c), wherein R of the formula (b) is methyl or phenyl. When R is methyl, the compound of formula (b) is 4'-Hydroxyacetophenone. When R is phenyl, the compound of formula (b) is 4-Hydroxybenzophenone.

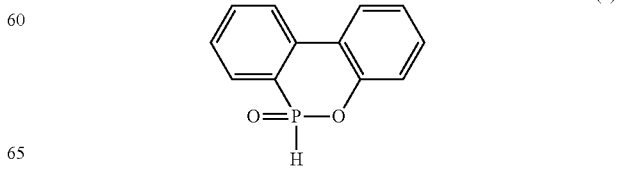

(a)

(b)

HO—⟨C₆H₄⟩—C(=O)—R (c)

⟨C₆H₅⟩—OH

The molar ratio among the compounds shown in formula (a), (b) and (c) is 1:5:1. The amount of acid catalyst used is 0.1-5.0 wt % based on the weight of the DOPO. The acid catalyst can be a proton acid or a Lewis acid. The proton acid is p-toluenesulfonic acid, methanesulfonic acid, sulfuric acid, oxalic acid, hydrogen chloride, hydrogen bromide, or hydrogen iodine, for example.

Generally, the method for synthesizing the phosphorus-containing bisphenol includes the following steps. First, the reactants shown in formula (a), (b), (c) and the acid catalyst are mixed in a 250 ml three-necked flask reactor at room temperature. The temperature of the reactants is raised to 130° C. for 24 hours to perform the reaction and then the temperature of the reactants is decreased to room temperature. A crude product separated out from the cooled mixture is washed by ethanol and then filtered and dried to obtain a white powder. The white powder is the phosphorus-containing bisphenol.

The chemical structure of the phosphorus-containing bisphenol synthesized by the foregoing method is shown as following formula (i). R of the formula (i) is methyl or phenyl.

(i)

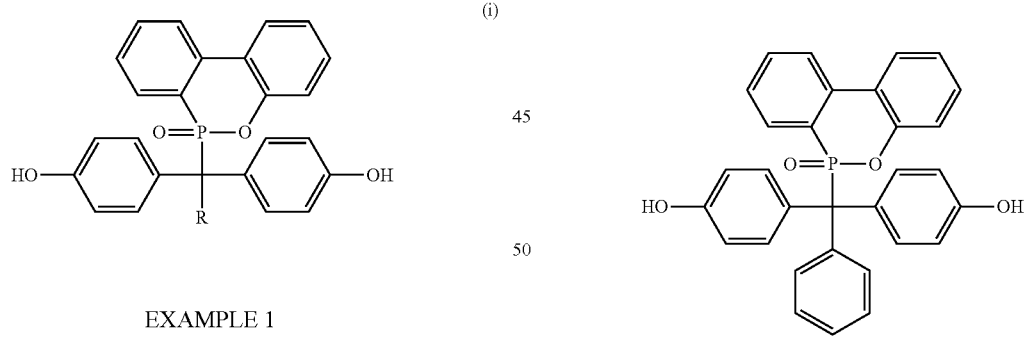

EXAMPLE 1

10.81 g (0.05 mole) of DOPO, 23.5 g (0.25 mole) of phenol, 6.81 g (0.05 mole) of 4'-Hydroxyacetophenone, and 0.432 g (4 wt % based on the weight of DOPO) of p-toluenesulfonic acid were mixed and stirred in a 250 ml three-necked flask reactor at room temperature in advance. The reactants were stirred constantly at 130° C. for 24 hours to form a mixture, and then the temperature of the mixture was cooled down to the room temperature. The crude products separated out from the cooled mixture were washed by ethanol and then filtrated and dried to obtain a white powder. The white powder was the phosphorus-containing bisphenol, and the chemical structure of the phosphorus-containing bisphenol is shown as the following formula.

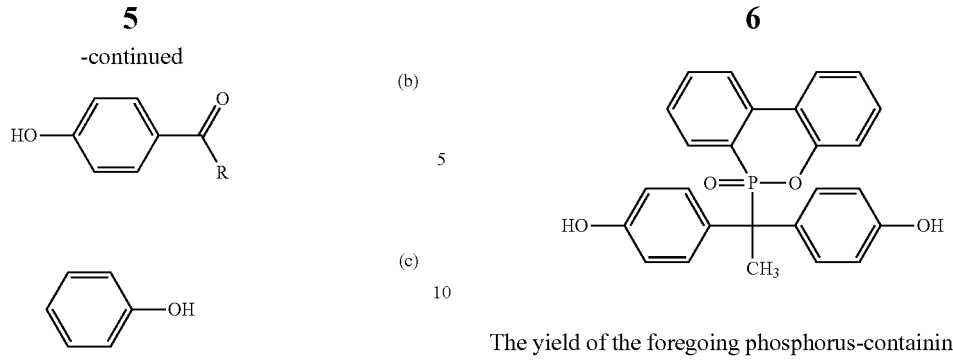

The yield of the foregoing phosphorus-containing bisphenol was 85%, and the melting point was 306° C. The m/z value of the foregoing phosphorus-containing bisphenol was analyzed by the high-resolution mass spectrometer (FAB+). The measured m/z value of the molecular $MH^+$ peak is 429.1266, and the chemical formula was $C_{26}H_{22}O_4P$ (the theoretical m/z value was 428.1177, and the chemical formula was $C_{26}H_{21}O_4P$). The measured value of the carbon, hydrogen, and oxygen element were 72.48%, 4.65%, and 14.90%, respectively (the theoretical value, C, 72.89%; H, 4.65%; O, 14.94%.) by element analysis.

EXAMPLE 2

10.81 g (0.05 mole) of DOPO, 23.5 g (0.25 mole) of phenol, 9.91 g (0.05 mole) of 4-Hydroxybenzophenone, and 0.216 g (2 wt % based on the weight of DOPO) of p-toluenesulfonic acid were mixed and stirred in a 250 ml three-necked flask reactor at room temperature in advance. The reactants were stirred constantly at 130° C. for 24 hours to form a mixture, and then the temperature of the mixture was cooled down to the room temperature. The treated mixture was dissolved in ethanol and then added to hot water to precipitate the crude product. The crude product was filtrated and dried to obtain the phosphorus-containing bisphenol of the following formula. The yield was 87%, and the melting point was 288° C.

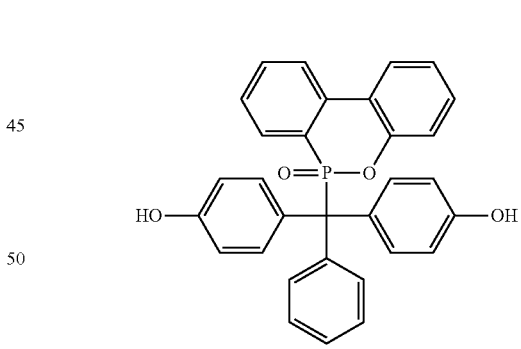

Method for Synthesizing Phosphorus-Containing Epoxy Resins

A phosphorus-containing epoxy resin shown in formula (I) is synthesized by a catalyzed reaction between a phosphorus-containing bisphenol shown as formula (i) and an epoxy monomer shown as formula (ii). In detail, an epoxy monomer is added in a 100 ml reactor and stirred at 150° C. for 1 hour. Then, a phosphorus-containing bisphenol and a catalyst are added into the reactor, and all reactants and the catalyst are stirred at 150° C. for 2 hours. The product of the foregoing reaction system is the phosphorus-containing epoxy resin, which is semi-solid.

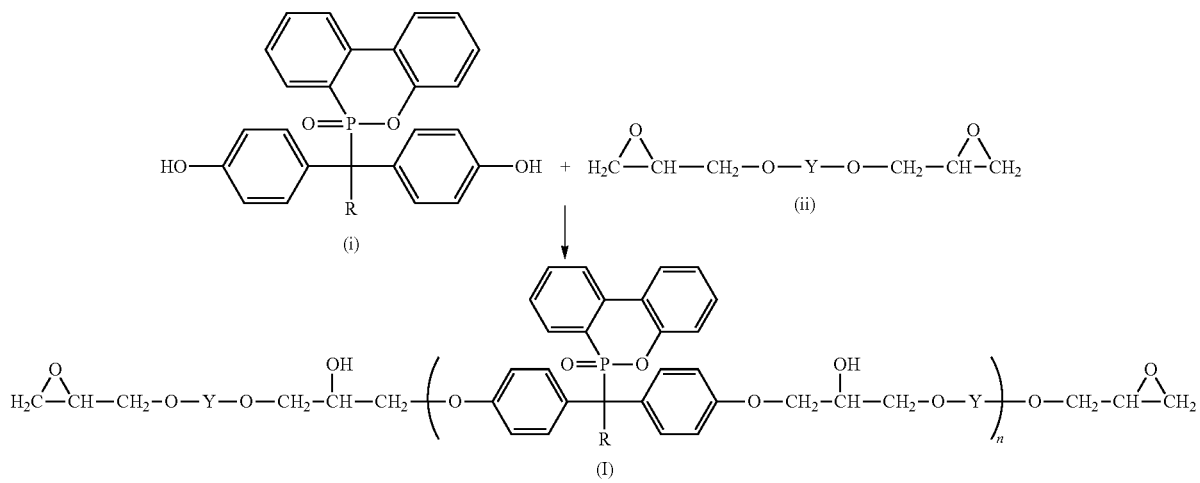

R is methyl or phenyl, and n is an integer from 1 to 9. Y is selected from the group consisting of following groups:

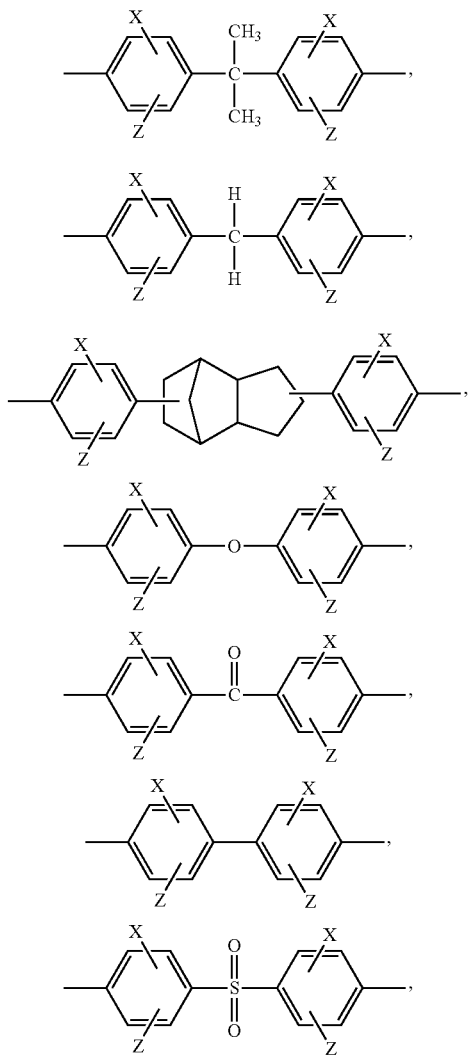

X and Z are independently selected from the group consisting of a hydrogen atom, an alkyl group with one to six carbon atoms, an alkoxyl group with one to six carbon atoms, —$CF_3$, a phenyl group, a halogen atom, a phenoxyl group, and a cyclic alkyl group with three to seven carbon atoms.

The foregoing reaction temperature is 100° C.-200° C. The equivalent ratio of the epoxy monomer defined by the formula (ii) to the phosphorus-containing bisphenol defined by the formula (i) is 1:1 to 10:1. The amount of the catalyst used is 0.1-5 wt % based on the amount of the epoxy monomer defined by the formula (ii).

The catalyst is an imidazole, a tertiary amine, a tertiary phosphine, a quaternary ammonium salt, a quaternary phosphonium salt, a boron trifluoride complex, or a lithium compound, for example. The imidazole is 2-phenylimidazole or 2-methylimidazole. The tertiary phosphine is triphenylphosphine. The quaternary ammonium salt is benzyltrimethyl ammonium chloride, benzyltriethyl ammonium chloride, or tetrabutyl ammonium chloride. The quaternary phosphonium salt is ethyltriphenyl phosphonium acetate or ethyltriphenyl phosphonium halides.

Some examples are listed in Table 1. Every example was synthesized with various kinds and weights of the phosphorus-containing bisphenols, the epoxy monomers, and the catalysts.

The phosphorus-containing bisphenol used for synthesizing the examples was the forgoing example 1 or example 2. The epoxy monomer defined by formula (ii) was diglycidyl ether of bisphenol A (DGEBA, epoxy equivalent: 188 g/equivalent, Y of formula (ii) is Y1), diglycidyl ether of bisphenol (DGEBF, epoxy equivalent: 175 g/equivalent, Y of formula (ii) is Y2), or dicyclopentadiene epoxy (DGEBF, epoxy equivalent: 250 g/equivalent, Y of formula (ii) is Y3).

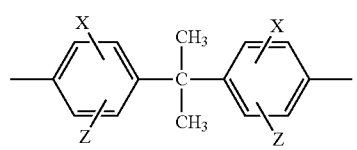 Y1

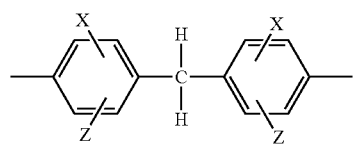 Y2

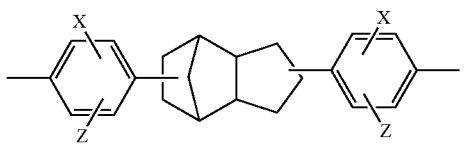 Y3

The catalyst was triphenylphosphine or 2-methylimidazole. The weight of every reactant, the theoretical phosphorus content and the epoxy equivalent of every example are listed in Table 1.

circuit board and electric encapsulant. The foregoing hardener is 4,4'-diaminodiphenylsulfone (DDS), for example.

Generally, equal equivalent ratio of the phosphorus-containing epoxy resin and the hardener are mixed. The mixture is cross-linked and cured at high temperature to form the cured phosphorus-containing epoxy resin. The reaction is preceded at 180° C. for 2 hours and then at 220° C. for 2 hours.

Properties Test

The alkali, resistance of the example 1 and the comparative example 1 were tested. The chemical structure of the comparative example 1 is shown below.

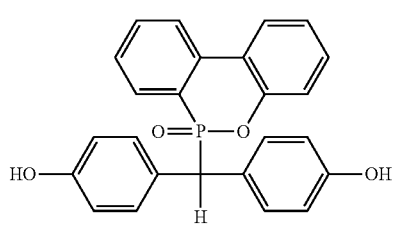 [SMILES: O=P1(C(c2ccc(O)cc2)c2ccc(O)cc2)Oc2ccccc2-c2ccccc21]

The method of alkali resistance test is described as following. First, dinitro derivatives of the example 1 and the comparative example 1 were synthesized, respectively. The

TABLE 1

| | | Example | | | | |
| --- | --- | --- | --- | --- | --- | --- |
| | Reactant | 3 | 4 | 5 | 6 | 7 |
| Phosphorus-containing bisphenol | Example 1 | 5.23 g | 6.38 g | 7.63 g | 10.55 g | 14.51 g |
| Epoxy resin | DGEBA | 20 g | 20 g | 20 g | 20 g | 20 g |
| Catalyst | Triphenylphosphine | 0.1 g | 0.1 g | 0.1 g | 0.1 g | 0.1 g |
| Epoxy equivalent | Measurement value | 323 g | 356 g | 407 g | 549 g | 861 g |
| | Theoretical value | 308 g | 344 g | 391 g | 535 g | 848 g |
| Theoretical Phosphorus content | | 1.5 wt % | 1.75 wt % | 2.0 wt % | 2.5 wt % | 3.0 wt % |

| | | Example | | | | |
| --- | --- | --- | --- | --- | --- | --- |
| | Reactant | 8 | 9 | 10 | 11 | 12 |
| phosphorus-containing bisphenol | Example 1 | 6.38 g | 6.38 g | — | — | — |
| | Example 2 | — | — | 7.65 g | 7.65 g | 7.65 g |
| Epoxy resin | DGEBA | — | — | 20 g | — | — |
| | DGEBF | 20 g | — | — | 20 g | — |
| | DCPDE | — | 20 g | — | — | 20 g |
| Catalyst | Triphenylphosphine | — | — | 0.1 g | — | — |
| | 2-methylimidazole | 0.1 g | 0.1 g | — | 0.1 g | 0.1 g |
| Epoxy equivalent | Measurement value | 318 g | 531 g | 381 g | 341 g | 573 g |
| | Theoretical value | 312 g | 526 g | 368 g | 333 g | 567 g |
| Theoretical Phosphorus content | | 1.75 wt % | 1.75 wt % | 1.75 wt % | 1.75 wt % | 1.75 wt % |

The foregoing phosphorus-containing epoxy resin can be cured by reacting with a hardener. The cured phosphorus-containing epoxy resin has good thermal properties and flame retardant properties and can be used to produce the printed chemical structures of the dinitro derivatives were analyzed by $^1$H NMR. The chemical structures of the dinitro derivative of the example 1 and the comparative example 1 are shown as formula (iii) and formula (iv), respectively.

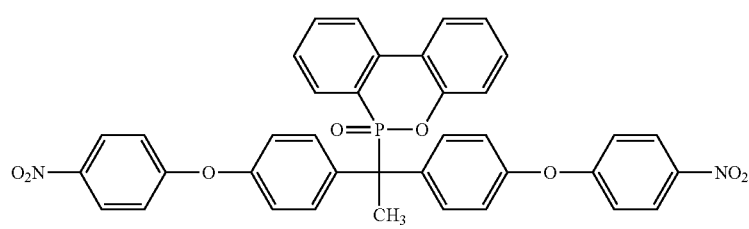

(iii)

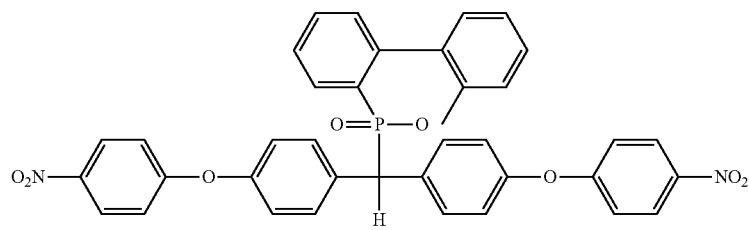

(iv)

Then, 1.0 g of the dinitro derivative and 3.0 g of sodium hydroxide were added and dissolved in 19 ml dimethylformamide (DMF) and 1 ml water. The compounds in the solution were analyzed by $^1$H NMR after the solution is stirred for 12 hours.

Figure 2A:
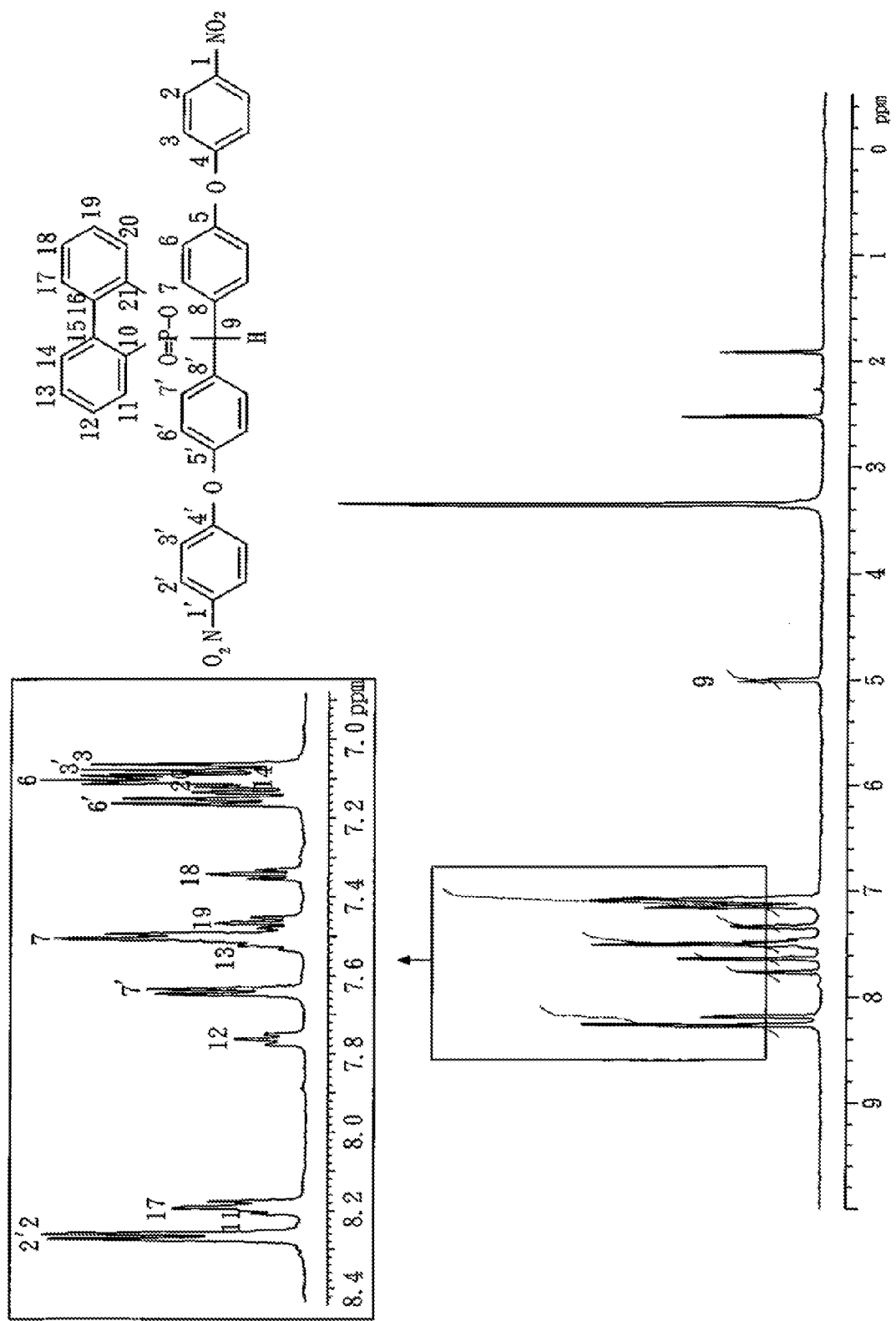
FIG. 2A and FIG. 2B are diagrams of $^1$H NMR spectra of a dinitro derivative of the comparative example 1 before and after the dinitro derivative dissolved in the alkaline solution, respectively.
Figure 2B:
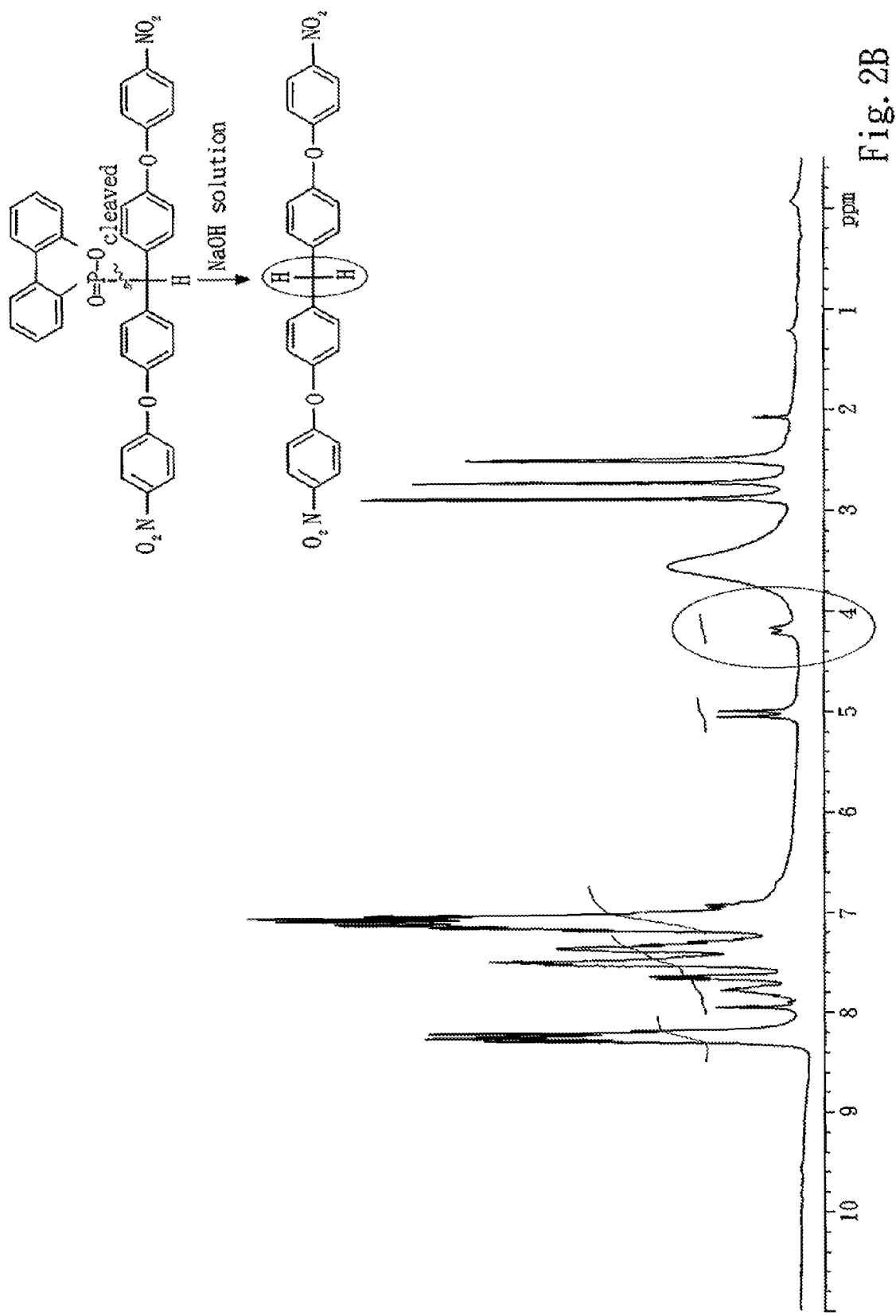

FIG. 1A and FIG. 1B are diagrams of $^1$H NMR spectra of a dinitro derivative of the example 1 before and after the dinitro derivative dissolved in the alkaline solution, respectively. FIG. 2A and FIG. 2B are diagrams of $^1$H NMR spectra of a dinitro derivative of the comparative example 1 before and after the dinitro derivative dissolved in the alkaline solution, respectively. As shown as FIG. 1A and FIG. 1B, the chemical structure of the dinitro derivative of the example 1 was unchanged before and after the dinitro derivative was dissolved in the alkaline solution. However, as shown as FIG. 2A and FIG. 2B, a new $CH_2$ peak signal appeared at 4.1 ppm, as shown in the circle of FIG. 2B, since the P—C bond of the biphenyl phosphinate was cleaved after the dinitro derivative of the comparative example 1 was dissolved and stirred in the alkaline solution.

Another method of alkali resistance test is described as following. Epoxy derivatives were formed by epoxidation of the example 1 and the comparative example 1, respectively. The epoxidation was catalyzed by sodium hydroxide. The chemical structures of the example 1, the comparative example and the epoxy derivatives thereof were analyzed by $^1$H NMR. The chemical structures of the epoxy derivatives of the example 1 and the comparative example 1 are shown as formula (v) and formula (vi), respectively.

(v)

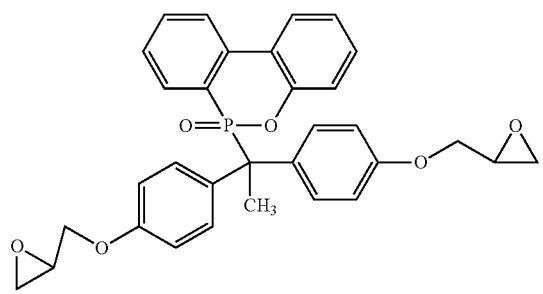

-continued (vi)

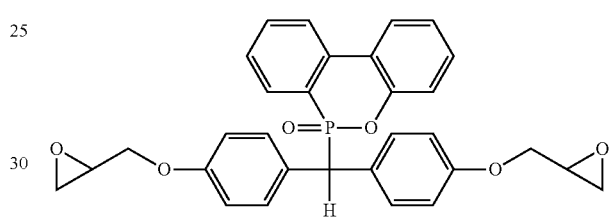

Figure 3A:
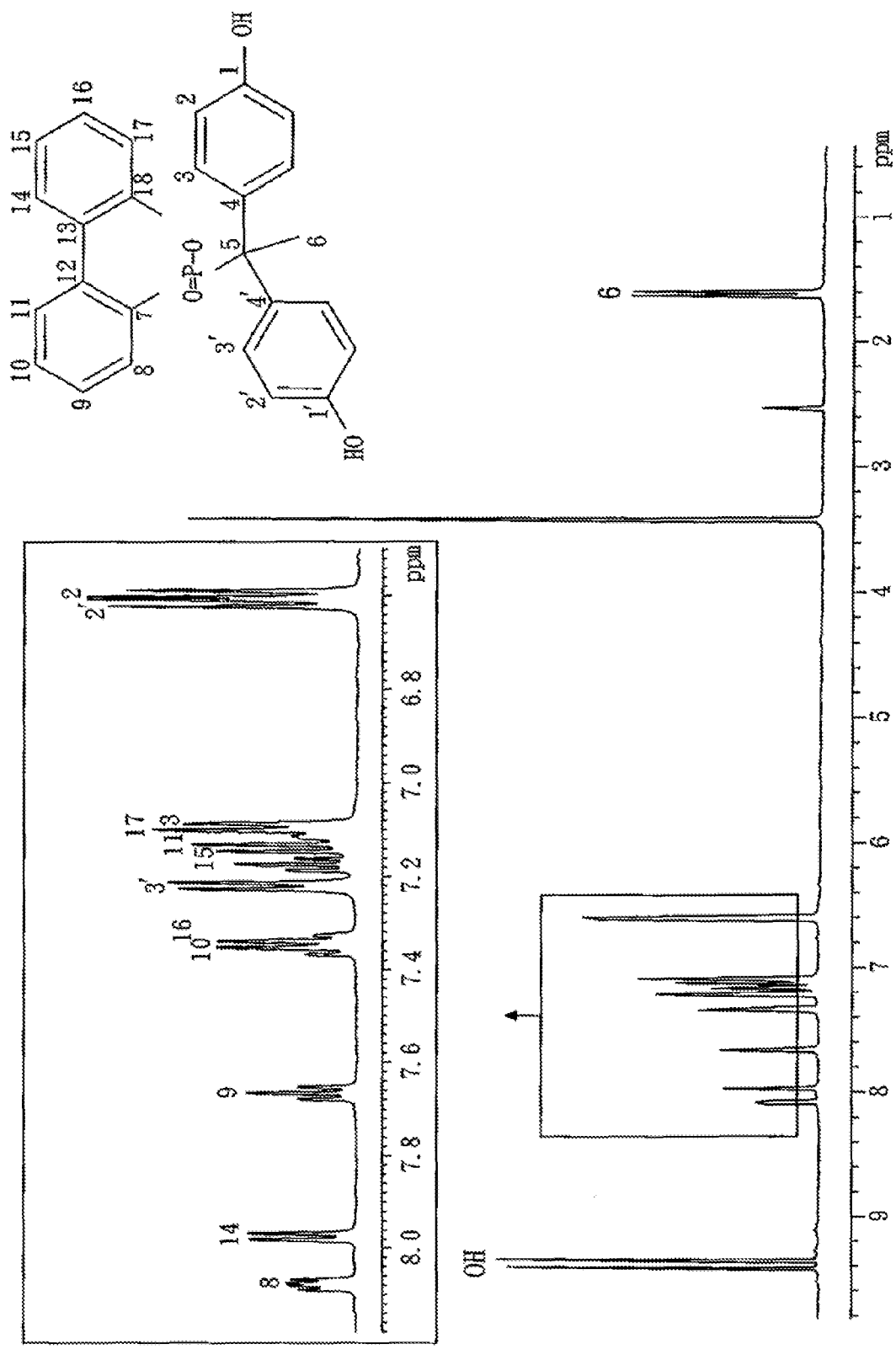
FIG. 3A and FIG. 3B are diagrams of $^1$H NMR spectra of the example 1 and the epoxy derivative thereof, respectively.
Figure 3B:
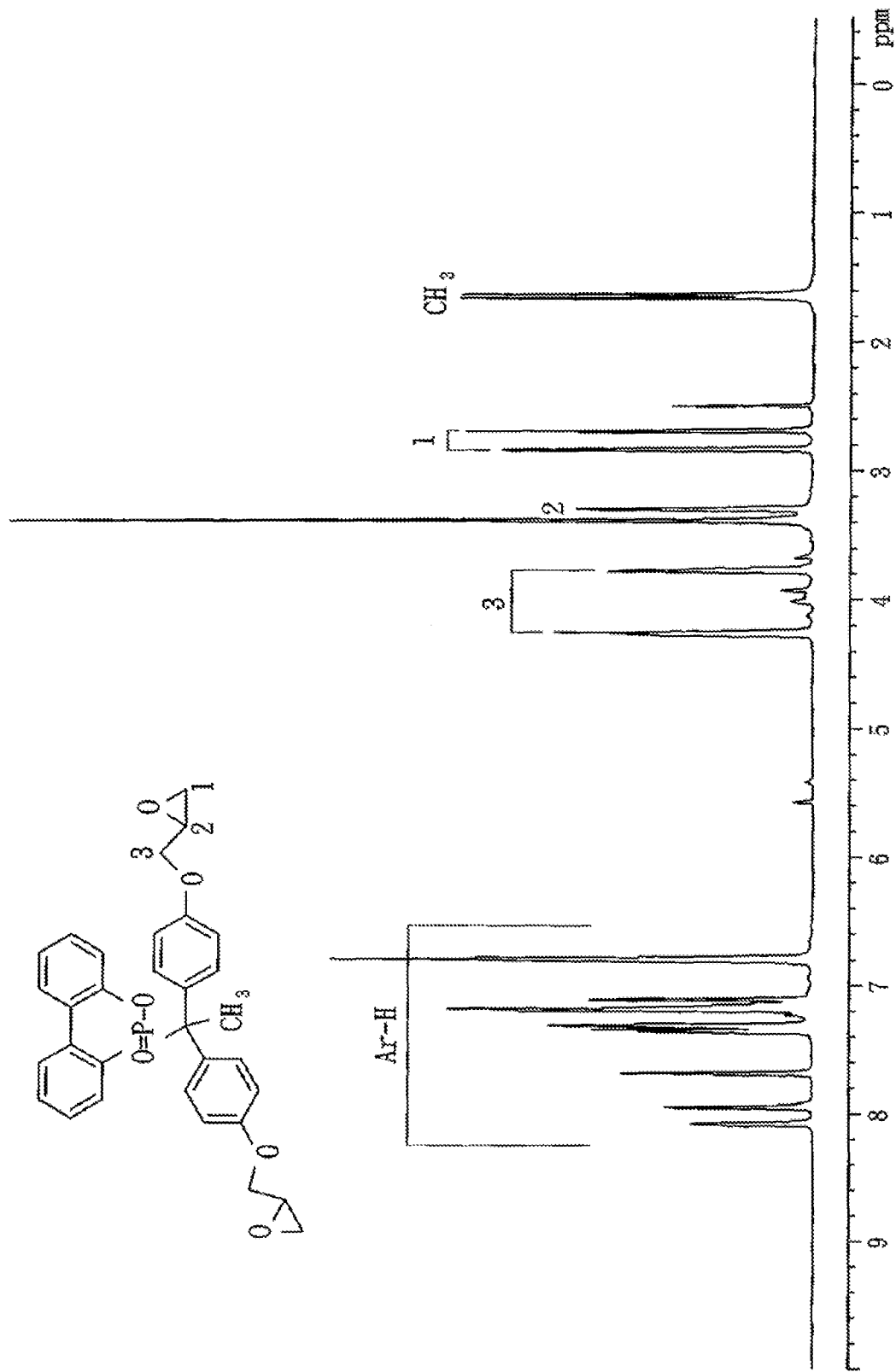
Figure 4A:
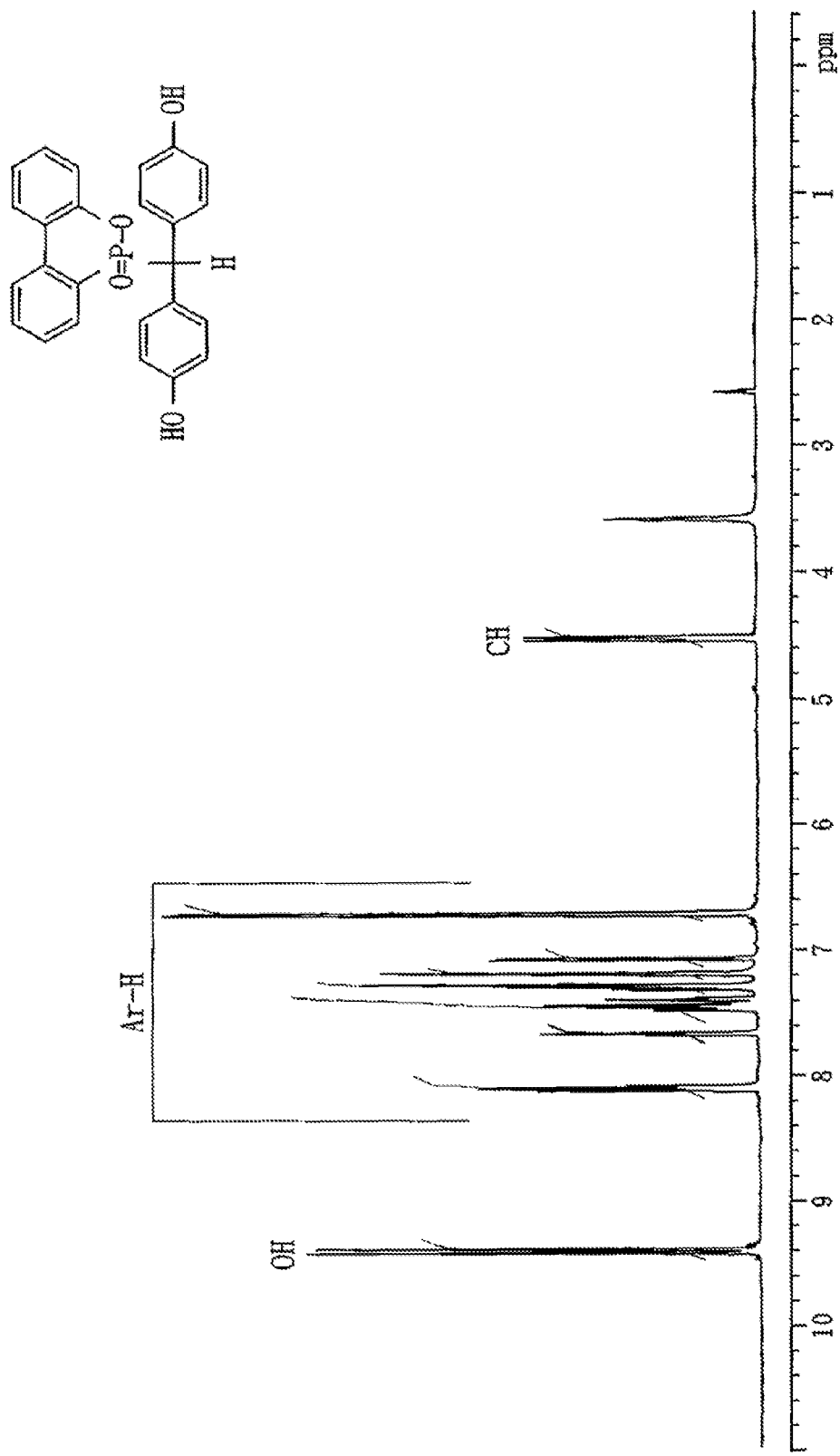
FIG. 4A and FIG. 4B are diagrams of $^1$H NMR spectra of the comparative example 1 and the epoxy derivative thereof, respectively.
Figure 4B:
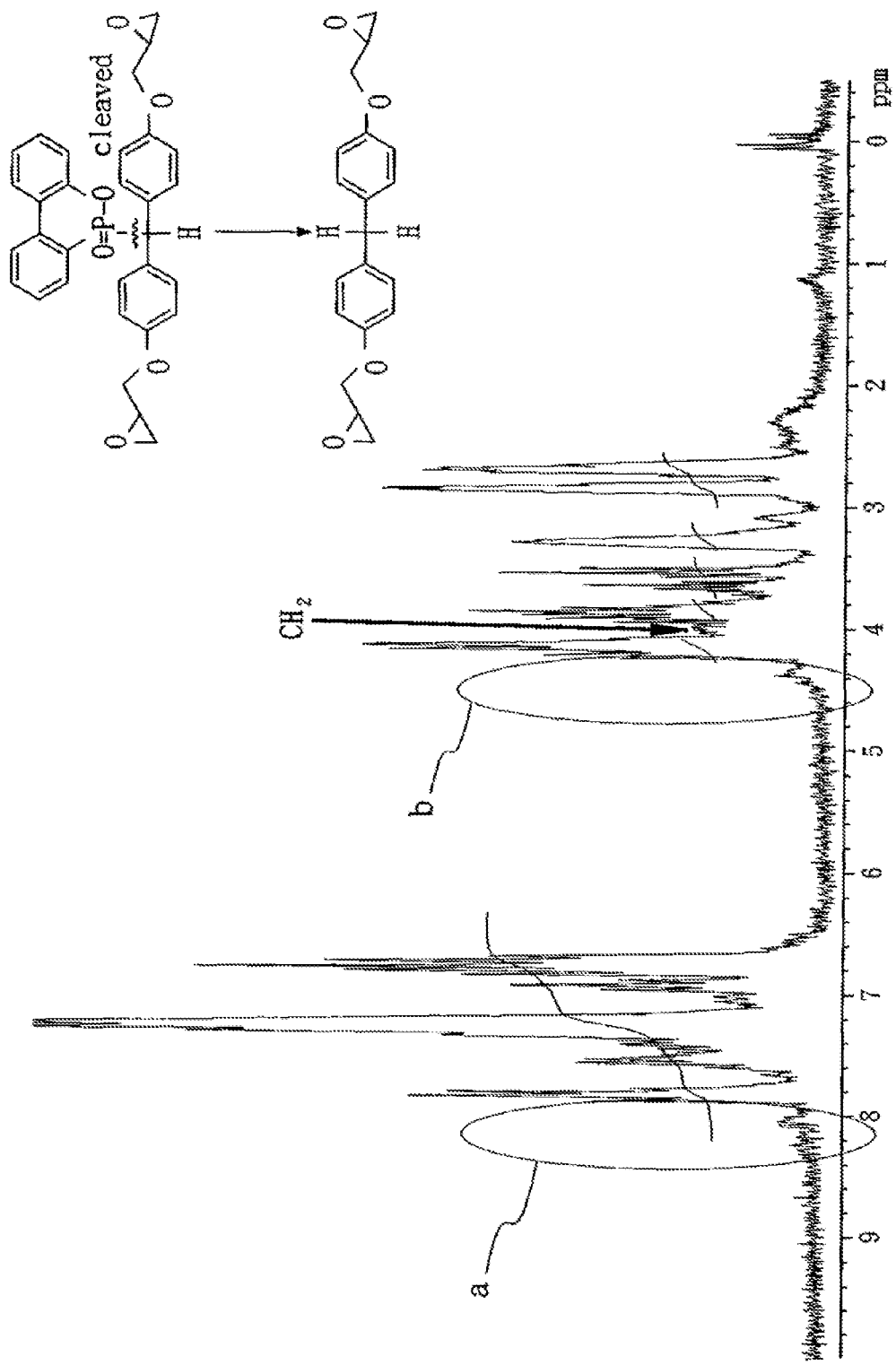

FIG. 3A and FIG. 3B are diagrams of $^1$H NMR spectra of the example 1 and the epoxy derivative thereof, respectively. FIG. 4A and FIG. 4B are diagrams of $^1$H NMR spectra of the comparative example 1 and the epoxy derivative thereof, respectively. The hydrogen peaks of the benzene ring of the example 1 and the epoxy derivative thereof were unchanged in FIG. 3A and FIG. 3B. The biphenylene phosphinate group of the example 1 was stable under alkali environment.

However, as shown as FIG. 4A and FIG. 4B, the hydrogen peaks of the benzene ring of the epoxy derivative of the comparative example 1 were changed. For example, the hydrogen peak signal at 8.0 ppm decreased, as shown in the circle a of FIG. 4B, and a new peak signal appeared at 6.9 ppm in FIG. 4B. The CH peak signal at 4.5 ppm decreased, as shown in the circle b of FIG. 4B, and a new Ph-$CH_2$-Ph peak signal appeared in FIG. 4B. The C—P bond of the biphenyl phosphinate of the comparative example 1 was cleaved under alkali environment. In other words, the biphenylene phosphinate group of the comparative example 1 was unstable under alkali environment.

Accordingly, the phosphorus-containing bisphenol of the example 1 has more alkali resistance than that of the comparative example 1. Therefore, the phosphorus-containing epoxy resin synthesized from the example 1 has alkali resistance.

The comparative examples 2-4 were the phosphorus-containing epoxy resin with different phosphorus contents. The comparative examples 2-4 were synthesized from the comparative example 1 according to the foregoing method for synthesizing the phosphorus-containing epoxy resin. The phosphorus contents of the comparative examples 2-4 were 1.5 wt %, 2.0 wt %, and 2.5 wt %, respectively.

The examples 3-7 and the comparative examples 2-4 were reacted with the hardener to form the cured phosphorus-containing epoxy resins. The thermal property, the thermal stability and the flame retardant property of the cured phosphorus-containing epoxy resins were tested. The phosphorus contents of the cured phosphorus-containing epoxy resins were measured, too.

The thermal property, i.e. glass transition temperature (Tg) of the cured phosphorus-containing epoxy resin, is measured by dynamic mechanical analysis (DMA). The thermal stabilities, i.e. decomposition temperature (Td) and the residue's weight percentage, were measured by thermogravimetric analyzer (TGA). The Td was the temperature with 5% weight loss of the sample. The residue's weight percentage was measured after the thermogravimetric analysis was performed at 800° C.

The flame retardant property was tested according to the UL94V vertical burning test, which is a national standard method. The steps of the UL94V vertical burning test are described below. A burner flame was applied to the free end of a specimen for 10 seconds and then removed. After the flaming combustion of the specimen ceased, the burner flame was applied again to the free end of the specimen for another 10 seconds and then removed. Duration of flaming combustion after the first burner flame application (lasting time of the first flaming), duration of flaming combustion after second burner flame application (lasting time of the second flaming), and whether or not flaming drips ignite cotton placed below specimen are recorded for each specimen.

The UL94V vertical burning test includes three classifications, which are 94V0, 94V1 and 94V2. The level V0 meant that the total flaming combustion for each specimen should not exceed 10 seconds, and none of the specimen should produce flaming drips that ignite absorbent cotton after the flame was removed. The level V1 meant that the total flaming combustion for each specimen should not exceed 30 seconds, and none of the specimen should produce flaming drips that ignite absorbent cotton after the flame was removed. The level V2 meant that the total flaming combustion for each specimen should not exceed 30 seconds, and some of the specimen should produce flaming drips that ignite absorbent cotton after the flame was removed. The results of the thermal property, the thermal stability and the flame retardant property of the examples 3-7 and the comparative examples 2-4 are listed in Table 2.

TABLE 2

| | Phosphorous content | Thermal property Tg | Thermal stability | |
|---|---|---|---|---|
| | | | Td | Residue |
| Example 3 | 1.25 wt % | 202° C. | 431° C. | 19 wt % |
| Example 4 | 1.48 wt % | 199° C. | 425° C. | 20 wt % |
| Example 5 | 1.73 wt % | 195° C. | 413° C. | 22 wt % |
| Example 6 | 2.24 wt % | 183° C. | 402° C. | 26 wt % |
| Example 7 | 2.80 wt % | 177° C. | 387° C. | 31 wt % |
| Comparative example 2 | 1.25 wt % | 199° C. | 422° C. | 7 wt % |
| Comparative example 3 | 1.73 wt % | 183° C. | 427° C. | 25 wt % |
| Comparative example 4 | 2.25 wt % | 180° C. | 419° C. | 26 wt % |

| | UL94V vertical burning Test | | | |
|---|---|---|---|---|
| | Lasting time of the first flaming | Lasting time of the second flaming | Flaming drips | Level |
| Example 3 | 9.8 sec | 3.0 sec | No | V1 |
| Example 4 | 8.5 sec | 1.8 sec | No | V1 |

TABLE 2-continued

| Example 5 | 3.7 sec | 2.0 sec | No | V0 |
| Example 6 | 5.4 sec | 1.2 sec | No | V0 |
| Example 7 | 2.1 sec | 0.9 sec | No | V0 |
| Comparative example 2 | 4.7 sec | 1.3 sec | No | V0 |
| Comparative example 3 | 3.3 sec | 1.7 sec | No | V0 |
| Comparative example 4 | 1.4 sec | 1.1 sec | No | V0 |

According to the results listed in Table 2, the Tg of the examples 3-7 was 177° C.-202° C. With the increase of the phosphorus content in the cured phosphorus-containing epoxy resins, the Tg of the examples decreased, but the residue's weight percentage of the examples increased from 19 wt % to 31 wt %. Similarly, with the increase of the phosphorus content in the cured phosphorus-containing epoxy resins, the Tg of the comparative examples also decreased. Therefore, the cured phosphorus-containing epoxy resins derived from the phosphorus-containing epoxy resin of the invention have good thermal property and thermal stability.

In flame retardant property, the UL94V level of the cured phosphorus containing epoxy resins of the examples 3-7 were better than V1. The UL94V level of the cured phosphorus containing epoxy resin was V0 when the phosphorus content was more than 1.73 wt %. Therefore, the phosphorus containing epoxy resins of the invention were flame retardant.

The Tg and the UL94V level of the cured phosphorus-containing epoxy resins derived from the foregoing examples 8-12 are listed in Table 3. The phosphorus contents of the examples 8-12 were 1.75 wt %, but the examples 8-12 were synthesized by various kinds of the phosphorus-containing bisphenols, the epoxy monomers, and the catalysts.

TABLE 3

| | Example | | | | |
|---|---|---|---|---|---|
| | 8 | 9 | 10 | 11 | 12 |
| Tg | 194° C. | 213° C. | 205° C. | 197° C. | 216° C. |
| UL94V level | V0 | V0 | V0 | V0 | V0 |

According to the results listed in Table 3, in addition to the phosphorus content, the kinds of the epoxy monomers also affected the Tg of the cured phosphorus-containing epoxy resins of the examples. In flame retardant property, the UL94V level of the cured phosphorus-containing epoxy resins of the examples were V0.

What is claimed is:

1. A phosphorus-containing epoxy resin defined by a general formula (I):

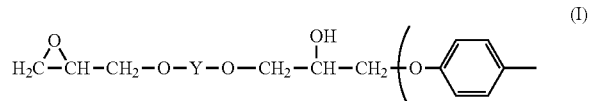
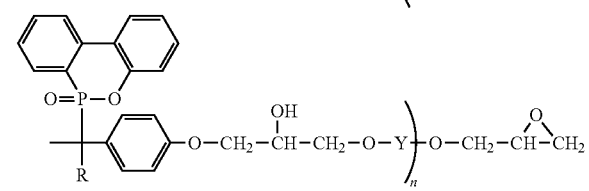

(I)

wherein n is an integer from 1 to 9, R is a methyl or a phenyl, and Y is selected from the group consisting of

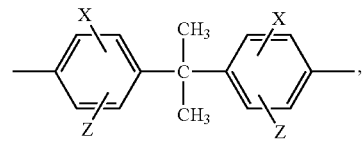

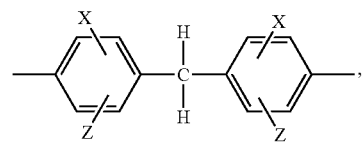

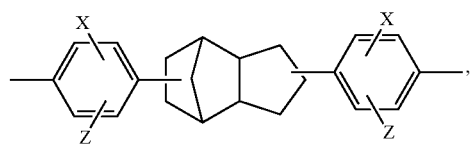

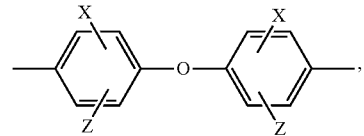

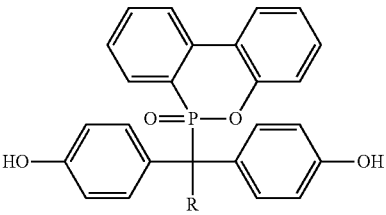

-continued

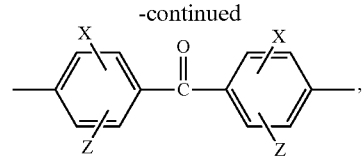

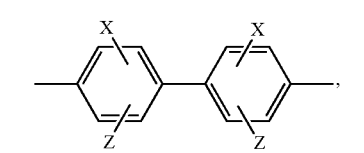

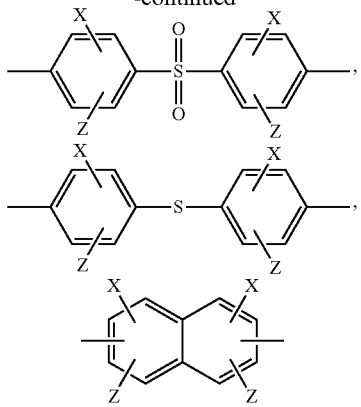

X and Z are independently selected from the group consisting of a hydrogen atom, an alkyl group having 1 to 6 carbon atoms, an alkoxyl group having 1 to 6 carbon atoms, —CF3, a phenyl group, a halogen atom, a phenoxyl group, and a cyclic alkyl group having 3 to 7 carbon atoms.

2. A method for synthesizing a phosphorus-containing epoxy resin, the method comprising:
performing a catalytic reaction of a phosphorus-containing bisphenol shown in formula (i), and an epoxy monomer shown in formula (ii) to yield the phosphorus-containing epoxy resin shown in formula (I), (ii)

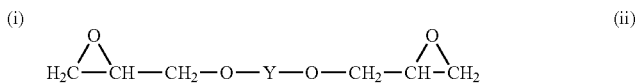

(I)

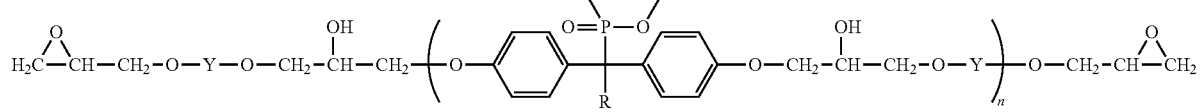

wherein n is an integer from 1 to 9, R is methyl or phenyl, and Y is selected from the group consisting of

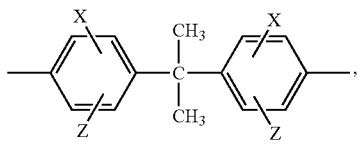

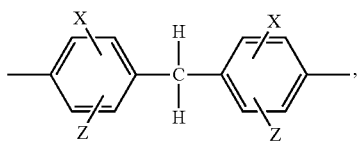

-continued

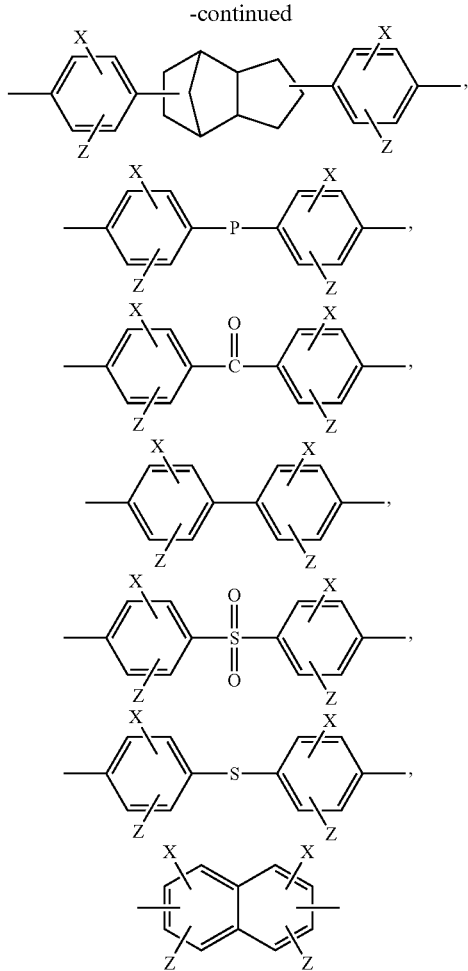

X and Z, are independently selected from the group consisting of a hydrogen atom, an alkyl group having 1 to 6 carbon atoms, an alkoxyl group having 1 to 6 carbon atoms, —$CF_3$, a phenyl group, a halogen atom, a phenoxyl group, and a cyclic alkyl group having 3 to 7 carbon atoms.

3. The method of claim 2, wherein the reaction temperature is 100-200° C.

4. The method of claim 2, wherein the equivalent ratio of the epoxy monomer defined by the formula (ii) to the phosphorus-containing bisphenol defined by the formula (i) is 1:1 to 10:1.

5. The method of claim 2, wherein an amount of a catalyst used to catalyze the reaction is 0.1-5 wt % based on the amount of the epoxy monomer defined by the formula (ii).

6. The method of claim 2, wherein the catalyst is an imidazole, a tertiary amine, a tertiary phosphine, a quaternary ammonium salt, a quaternary phosphonium salt, a boron trifluoride complex, or a lithium compound.

7. The method of claim 6, wherein the imidazole is 2-phenylimidazole or 2-methylimidazole.

8. The method of claim 6, wherein the tertiary phosphine is triphenylphosphine.

9. The method of claim 6, wherein the quaternary ammonium salt is benzyltrimethyl ammonium chloride, benzyltriethyl ammonium chloride, or tetrabutyl ammonium chloride.

10. The method of claim 6, wherein the quaternary phosphonium salt is ethyltriphenyl phosphonium acetate or ethyltriphenyl phosphonium halides.

* * * * *